United States Patent [19]

Norris

[11] Patent Number: 5,218,898
[45] Date of Patent: Jun. 15, 1993

[54] FOOD PROCESSING PLANT

[75] Inventor: David A. Norris, Bedfordshire, England

[73] Assignee: D C Norris & Company (Engineering) Limited, Bedfordshire, England

[21] Appl. No.: 787,522

[22] Filed: Nov. 4, 1991

[51] Int. Cl.⁵ .................. A47J 27/00; A23L 3/36; B01F 7/16; B01F 15/06
[52] U.S. Cl. ..................... 99/334; 99/348; 99/355; 99/357; 99/454; 99/455; 99/472; 99/517; 366/144; 366/147
[58] Field of Search ............ 99/348, 334, 352–356, 99/452–454, 455, 357, 467, 468, 470, 472, 517; 366/147, 144, 149; 62/342, 343; 165/109.1, 85

[56] References Cited

U.S. PATENT DOCUMENTS

| Re. 24,466 | 4/1958 | Toulmin, Jr. | 62/342 |
| 778,717 | 12/1904 | Stack | 99/455 |
| 1,759,578 | 5/1930 | Kelso | 165/85 |
| 1,764,269 | 6/1930 | Latterell | 165/85 |
| 2,083,837 | 6/1937 | Goecke | 366/147 |
| 2,315,603 | 4/1943 | Duncan | 99/455 |
| 2,575,094 | 11/1951 | Chamberlain | 99/455 |
| 2,696,775 | 12/1954 | Dean | 99/355 |
| 3,880,067 | 4/1975 | Hoffmann | 99/472 |
| 4,432,650 | 2/1984 | Langen et al. | 366/147 |
| 4,565,452 | 1/1986 | Wild | 165/109.1 |

FOREIGN PATENT DOCUMENTS

| 415971 | 3/1934 | United Kingdom . |
| 689304 | 1/1952 | United Kingdom . |
| 728617 | 3/1954 | United Kingdom . |
| 815895 | 9/1955 | United Kingdom . |
| 815707 | 10/1957 | United Kingdom . |
| 856948 | 3/1959 | United Kingdom . |
| 933126 | 1/1962 | United Kingdom . |
| 2072030 | 3/1981 | United Kingdom . |
| 2194820 | 4/1987 | United Kingdom . |
| 8911445 | 5/1989 | United Kingdom . |
| 8925015 | 11/1989 | United Kingdom . |
| 2232210 | 5/1990 | United Kingdom . |
| 2238606 | 5/1990 | United Kingdom . |

Primary Examiner—Timothy F. Simone
Attorney, Agent, or Firm—James D. Hall

[57] ABSTRACT

A food processing plant comprises a cooking kettle, a holding tank and a depositor. The holding tank is provided with wheels to permit the tank to be moved from a first position in the proximity of the cooking kettle to a second position in the proximity of the depositor. Means is provided for applying a vacuum to the tank in the first position to draw food product from the kettle through a first pipeline. Means is provided for applying pressurized air to the holding tank in the second position to expel the food product from the tank to the depositor. A cooling station is provided in the form of a booth into which the tank is movable after leaving the first position and before entering the second position. The booth includes frame means which supports a cooling unit movable from a raised position into a lowered position within the tank. The cooling unit includes rotary vanes with scrapers for contact with the wall of the tank. The cooling unit mounted on a cover adapted to rest on the rim of the tank.

9 Claims, 9 Drawing Sheets

FOOD PROCESSING PLANT

BACKGROUND OF THE INVENTION

This invention relates to methods and apparatus for cooling and transferring flowable food products.

In conventional food processing, flowable food products are pumped through a pipeline from one vessel to another. A disadvantage of this transfer arrangement is that the pump tends to break the food product down and reduce its quality. The food product may be metered into trays travelling along a filling line using a metering device in the form of a piston and cylinder unit. The cylinder has to be refilled at intervals, and this apparatus may have a damaging effect on food products.

In the assignee's UK patent application no. 2 194 820A, is proposed the use of a holding tank into which the food product is drawn under the effect of vacuum, and from which it is expelled under air pressure. Also proposed is the use of a metering device in the form of a plastics tube which is repeatedly nipped and released between parallel straight jaws.

It is essential that the quantities of food product dispensed into the trays be precisely controlled. It has been found that the accuracy with which food products are dispensed with the apparatus disclosed in the above-mentioned specification may be improved as described hereinafter by expelling flowable food product through a system of tubes arranged in the form of an inverted U, one limb of which extends downwards into the holding tank, and the other of which is associated with a flowmeter and provided with an outlet valve. It is also vital that the design of any equipment intended for use in the food processing industry should be such as to permit easy dismantling and cleaning.

Further it is desirable that provision be made for cooling the cooked food product in the holding tank so that it may be dispensed cold, preferably at a temperature of 4° C. or less. Hitherto vacuum cooling techniques have been used but tend to break down the Product and extract the volatile constituents, so that additional quantities of spices must be added. Other cooling systems are known from UK patent specifications Nos. 415971, 689304, 728617, 815707, 815895, 856948, 933126 and 2072030.

OBJECTS OF THE INVENTION

It is an object of the present invention to provide apparatus for dispensing flowable food products which has improved accuracy.

It is a further object of the invention to provide a cooling system for a holding tank for food product in which there is minimal risk of product breakdown.

It is a still further object of the invention to provide a method of transferring and processing food products which will speed up the complete operation while maintaining a high quality of the product.

DESCRIPTION OF PREFERRED EMBODIMENTS

Figure 1:
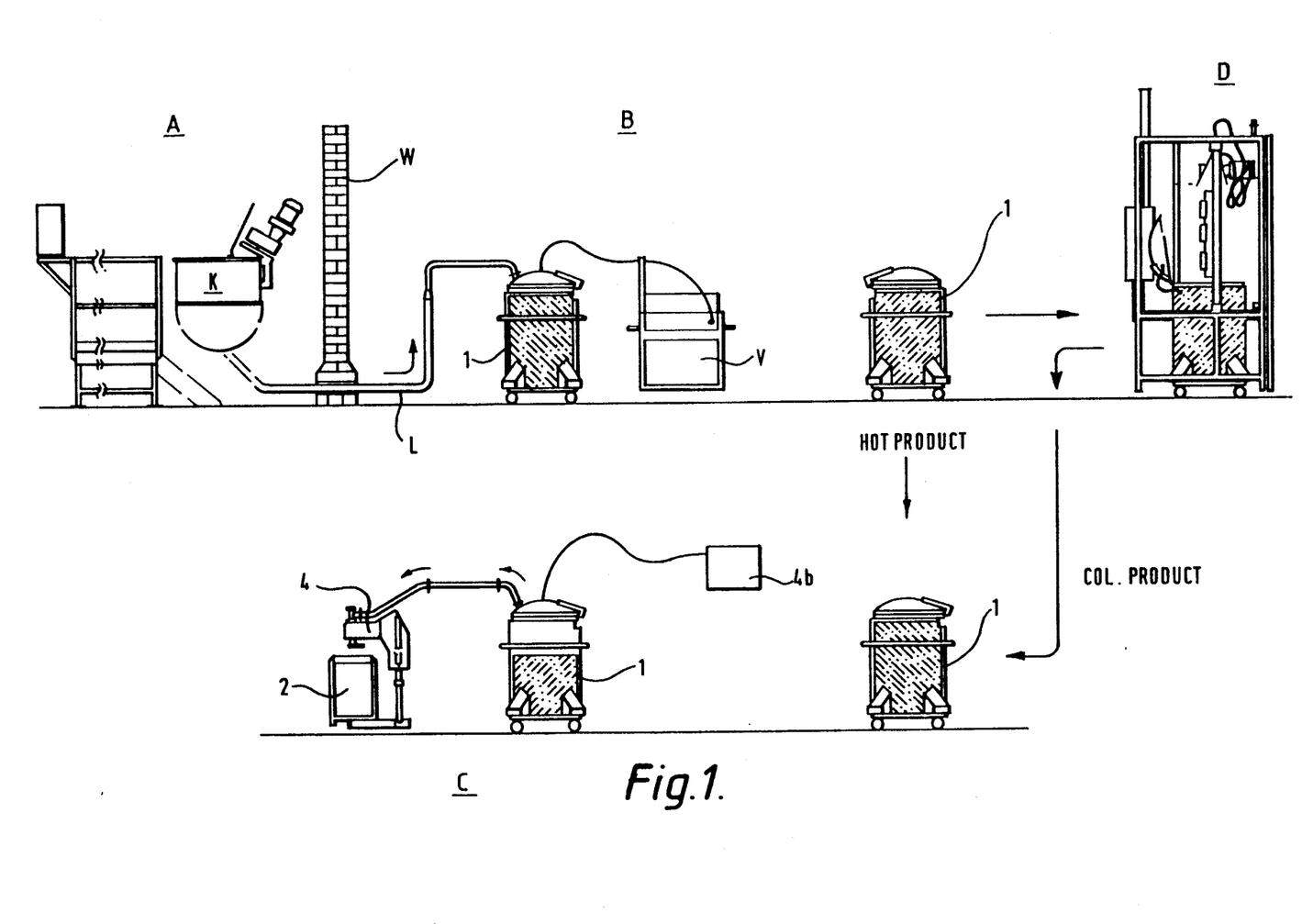
FIG. 1 schematically illustrates a cooking, transfer and cooling plant for a food product.

Referring to FIG. 1, a plant for cooking a non-liquid but flowable food product and dispensing the product into containers includes a cooking area A, a transfer station B, a dispensing station C and an optional cooling station D.

The cooking area A is separated from the transfer station and enclosed by a wall W to ensure sterility. In the cooking area the food product is cooked in a kettle K provided with mixing means. The ingredients are introduced into the kettle from an adjacent platform. The kettle is connected by a pipeline L which extends through the wall W into the transfer station. The kettle is of a type commercially available on the market, forms no part of the invention and will not be described further herein.

The plant includes a number of holding tanks 1 for the cooked food product. The tanks are capable of being wheeled through the plant from the transfer station B to the dispensing station C, via the cooling station D if desired.

At the transfer station the food product is drawn from the kettle into a holding tank 1 under vacuum applied from a vacuum trolley V, generally as described in the assignee's UK patent specification No. 2 194 820A.

Located at the dispensing station is a conveyor 2 along which containers may travel beneath a depositor 4. On its arrival at the dispensing station a holding tank 1 is connected to the depositor 4 and to a supply 4b of sterile air to promote the discharge of the food product to the depositor.

The cooling station B includes a number of cooling booths into which the holding tanks may be wheeled and connected to cooling units, in the event that it is desired to dispense cold food product at the dispensing station.

With the exception of the cooking area and transfer station, the remainder of the plant will now be described in more detail.

Figure 2:
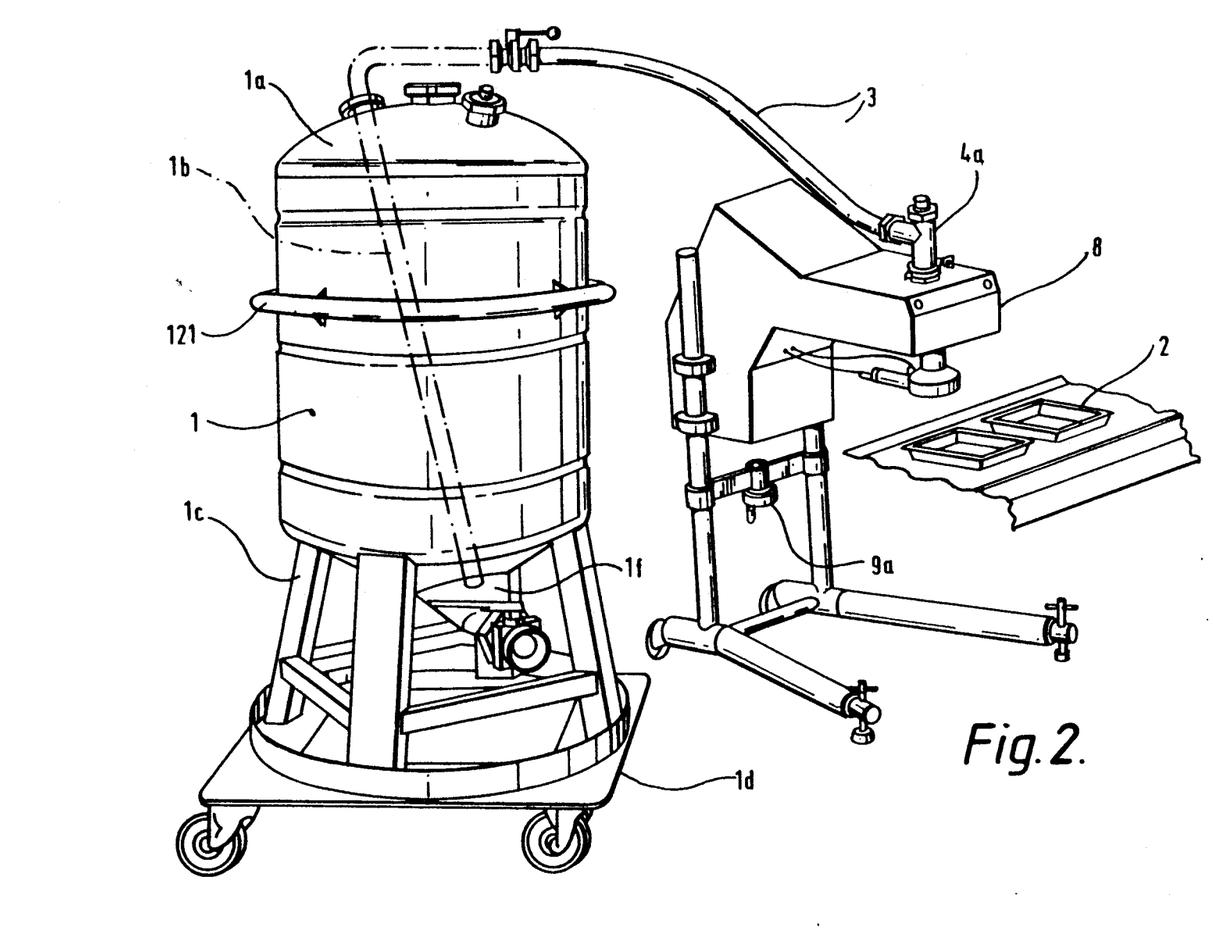
FIG. 2 is a perspective view of a holding tank for food product connected to a depositor.

Referring now to FIG. 2 of the drawings, the holding tank 1 is supported by a framework 1c on a wheeled base 1d. The framework is formed by hollow tubing to minimise the number of locations at which dirt may accumulate and to facilitate cleaning. The axis of the tank is vertical and its upper end is closed by a hinged lid 1a provided with a number of ports. A sump 1f extends downwards and to one side of the tank and has a port through which residues may be flushed during cleaning. A tube 1b passes through the hinged lid and extends at a shallow angle to the vertical to open at its lower end within the sump. A coupling 1e at the upper end of the tube 1b enables it to be connected to the pipeline or kettle as required.

A handling ring 121 surrounds the tank and is supported thereon by brackets. When the holding tank is at the dispensing station it is positioned adjacent the conveyor 2 for containers in the form of food trays intended, for example, for retail sale and heating in microwave or other domestic ovens. Food product is discharged in measured quantities into the trays by means of depositor 4 which is connected to the tube 1b by a pipeline 3. The food product is expelled through the pipeline 3 under the pressure of sterile air applied to a port of the tank from the sterile air unit 4b.

Figure 3:
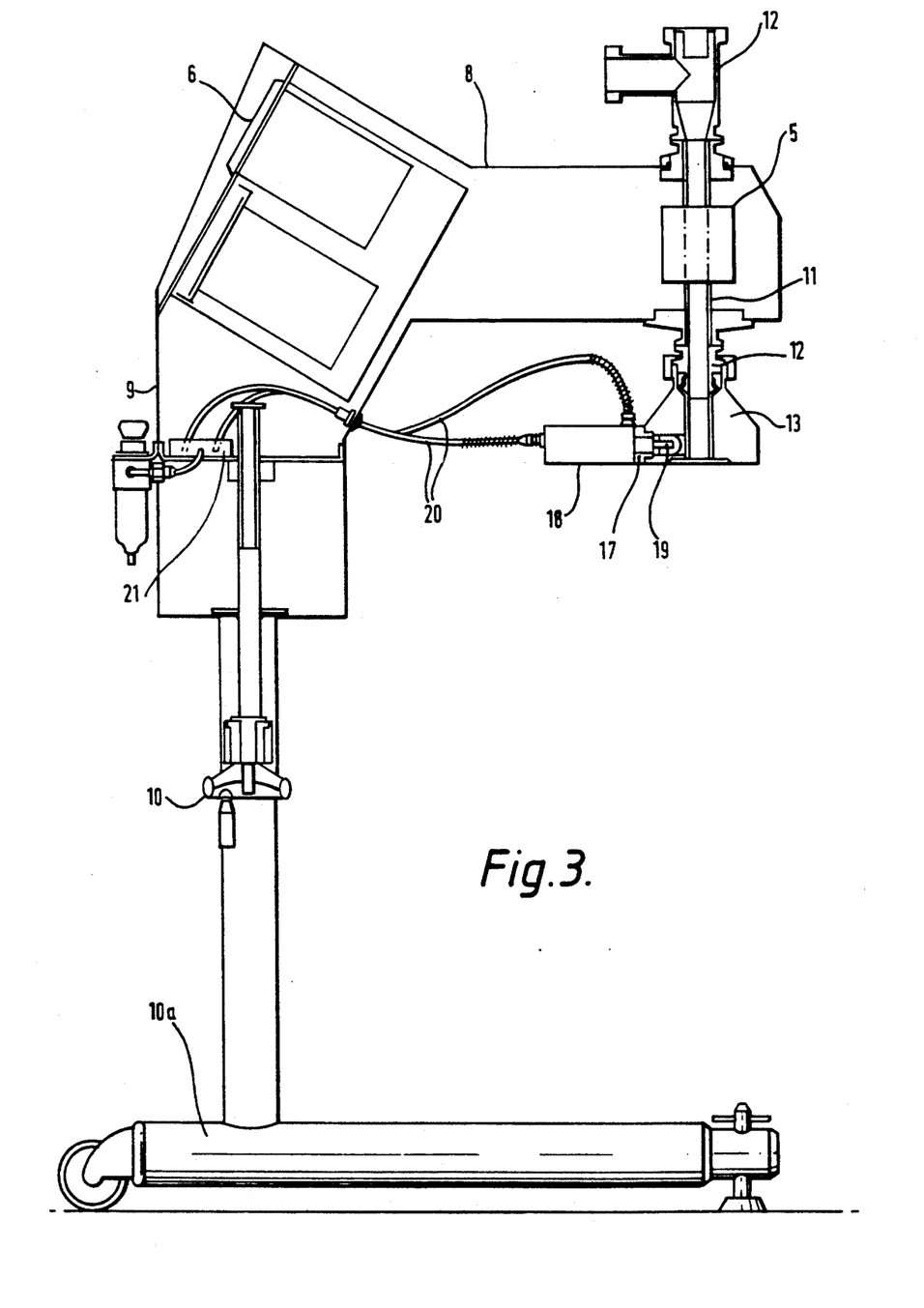
FIG. 3 is a vertical section through the depositor.

The pipeline 3 is connected to a depositor head 4a which, as shown in FIGS. 2 and 3, incorporates a flowmeter 5 of a commercially available type which generates an electrical pulse for each unit quantity of food product passing through the depositor head. A counter forming part of an electronic control circuit 6 counts the pulses and, on reaching a preset total, closes a valve 7 for a predetermined period of time to allow the full tray under the depositor head to be replaced by an empty tray. The depositor includes a casing 9 having an overhanging arm 8 in which the depositor head is supported. The casing 9 is mounted on vertical posts 10 provided with wheeled feet. A screw mechanism operated by a handle 9a allows the casing to be moved up or down the posts into the most suitable position relative to the conveyor.

Figure 4A:
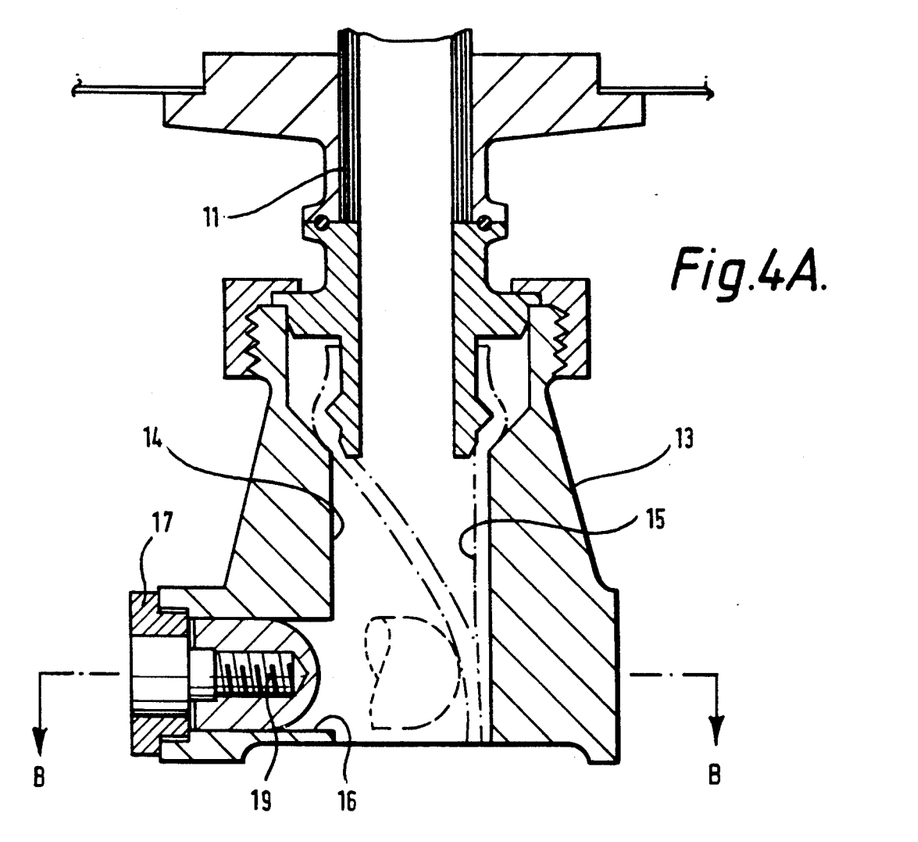
FIG. 4A is a vertical section through the depositor head.
Figure 4B:
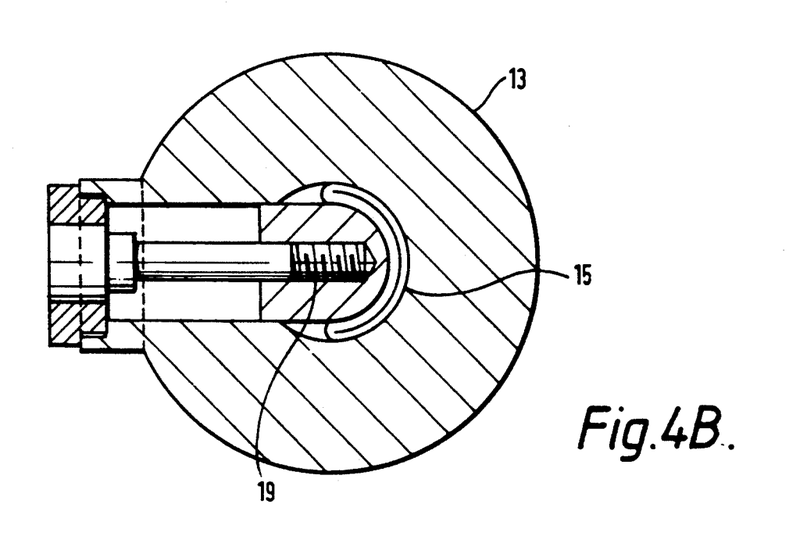
FIG. 4B is a cross-section taken on the line B—B in FIG. 4A.

The depositor head includes a vertical tube 11 having at its upper end an inlet 12 for connection to the pipeline 3. The tube 11 passes through the flowmeter 5 which is located within the arm 8 and is secured at its lower end to a fitting 12 onto which a conical valve support ring 13 is fitted. The ring 13 has a circular vertical bore 14 fitted with a silicon rubber tube 15. The bore 14 is intersected by a radial bore 16 having a screw threaded end portion for receiving an adaptor 17, into which the end of a pneumatic cylinder 18 is screwed. The piston rod 19 is fitted with a plastics head having a domed forward end. The radius of the domed end is equal to the internal radius of the bore 14 less twice the thickness of the wall of the tube 15. Consequently, when the piston rod is extended, the tube 15 is constricted into the semicircular shape shown in FIG. 4B.

Air is supplied to the cylinder 18 through lines 20 from a control unit 21 which is operated by the electrical circuit in response to the counting of the pulses from the flowmeter as described above.

The apparatus described above has a number of advantages compared with that disclosed in UK patent specification, No. 2 194 820A.

Figure 5:
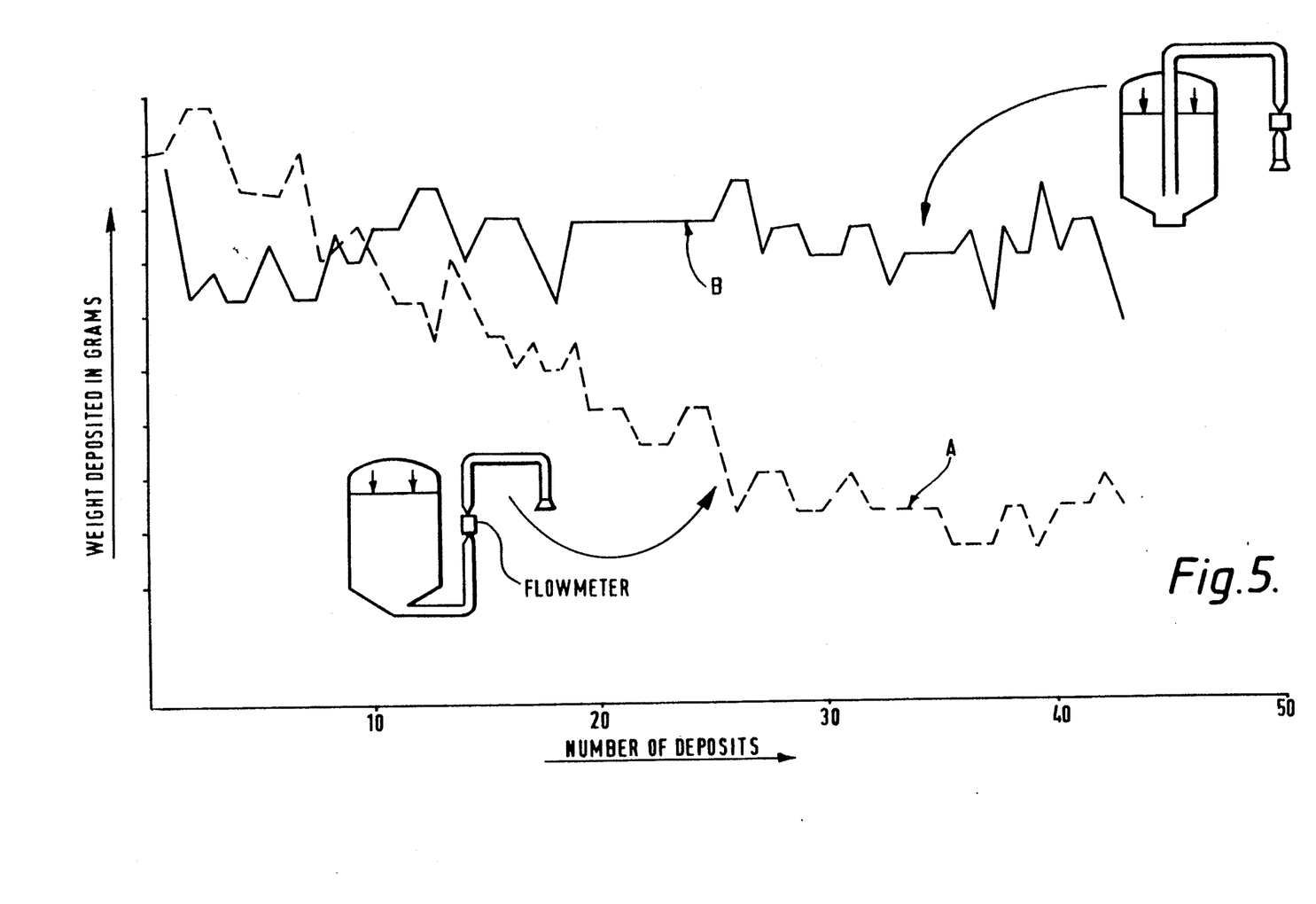
FIG. 5 is a graph to compare the accuracy of the depositor of the invention compared with that of the prior art.

First, because a finite time elapses between the response of the flowmeter to the passage of a predetermined quantity of product and the full closure of the depositor valve, a small excess quantity of product will be dispensed. The setting of the flowmeter may take this excess quantity into account if it is a constant, but not if it varies from tray to tray. It has been found that the velocity at which product is discharged from the tank disclosed in the abovementioned specification diminishes as the level of product in the tank falls, so that the metered quantity diminishes with time. This is illustrated in the graph shown in FIG. 5 in which curve A shows the results of an experiment using the arrangement disclosed in accordance with the above-mentioned specification using a flowmeter positioned where indicated in the figure. The results obtained are plotted with the weight deposited being shown on the y-axis with gradations in grams and the number of deposits being shown on the x-axis. An earlier attempt was made to overcome this problem by incorporating into the depositor a device arranged to respond to the pressure in the pipeline and adjust the valve opening time accordingly. This solution was complicated and did not operate satisfactorily. However, the problem has now been solved by the simple expedient of using a system of discharge tubes in the form of an inverted U. One arm of the inverted "U" descends into the holding tank either vertically or at a small inclination to teh vertical. The other arm of the "U" is associated with a flowmeter and control valve. The results of an experiment using this invention are depicted by curve B.

Second, the type of valve disclosed in patent specification no. 2 194 820A employs flat jaws to nip the dispensing tube. Such a valve has a slower response time compared with that of the valve described herein and is much more difficult to dismantle for cleaning. The valve described herein may be dismantled by unscrewing the cylinder from the conical ring and then unscrewing or unclamping the ring itself. Individual parts are reduced to a minimum and moving parts virtually eliminated.

Figure 6A:
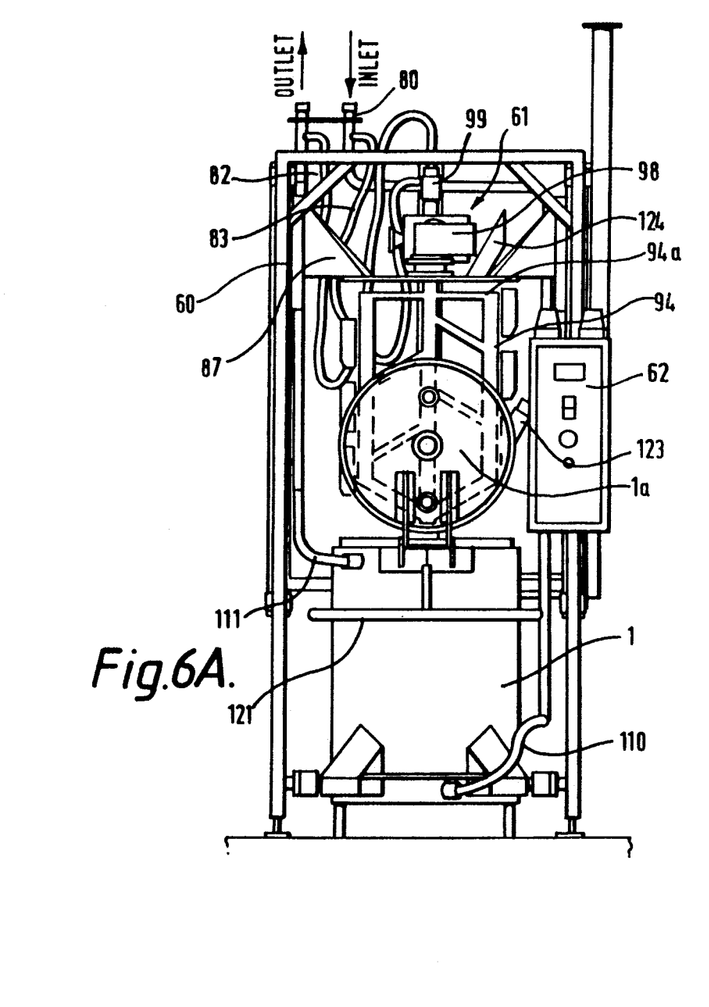
FIG. 6A is a front view of a cooling booth, with the cooling unit raised.
Figure 6B:
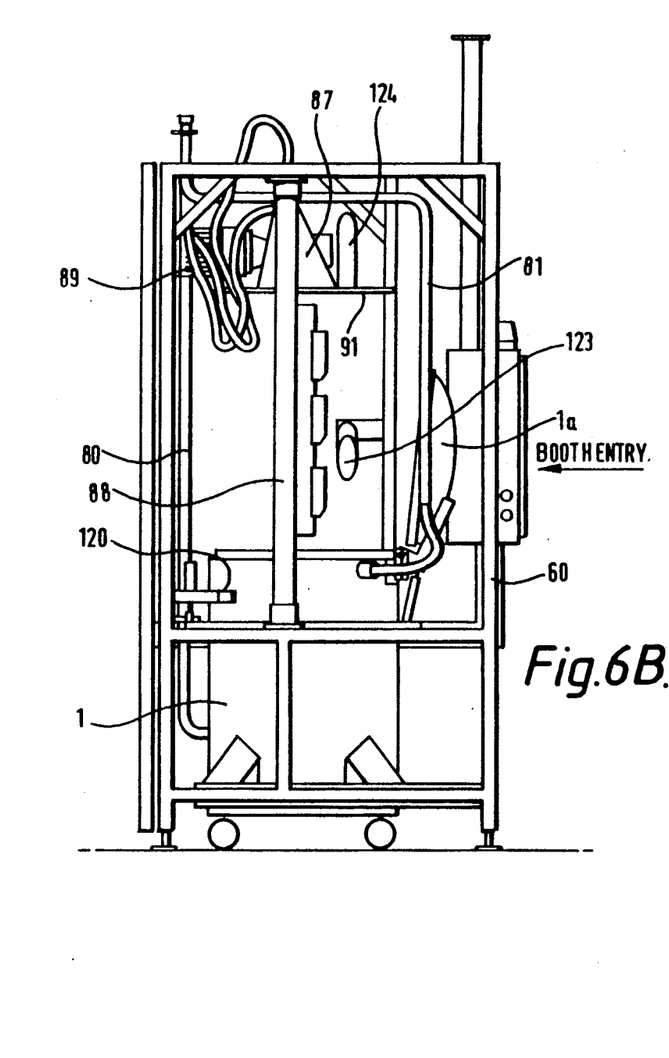
FIG. 6B is a side view of the cooling booth.

If it is desired to cool the food product before dispensing, the tank 1 is moved to the cooling station shown in FIGS. 6A and 6B. The cooling station includes a booth formed by a framework 60 on which a cooling unit 61 is supported for vertical movement under the action of pneumatic cylinders. Main inlet and outlet ducts 80, 81 supply coolant, conveniently in the form of ethylene glycol to the booth. The cooling unit includes a lid or cover 91 in which is journalled the shaft 92 of an agitator 93. An electric motor 89 serves to drive the shaft in rotation. The agitator includes upper and lower hollow radially extending supports 94a on which are mounted hollow vanes 94. The shaft 92 has concentric inner and outer ducts 95, 96 through which coolant may be supplied through the supports 94a to the lower ends of the vanes and withdrawn from their upper ends. Hollow flights 94b extend between the vanes 94 and outer duct 96 at an angle to the horizontal and also serve to conduct coolant. The coolant is supplied to and removed from the ducts 95, 96 respectively through a coupling 99 to which hoses 82 extend from the ducts 80, 81.

The tank has a hollow wall through which the coolant may be passed, and lower and upper ports to which coolant supply and outlet hoses 110, 111 may be attached when the tank is at the cooling station. The hoses 110, 111 are connected to the ducts 80, 81.

Figure 7A:
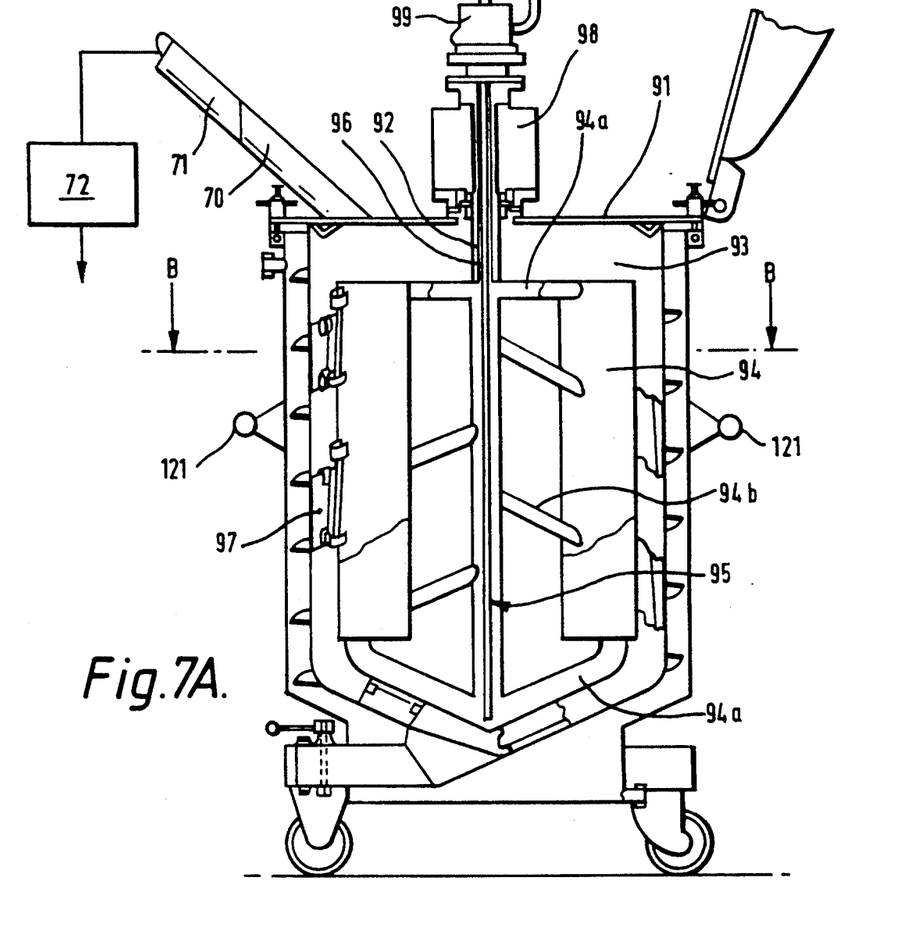
FIG. 7A is a vertical section through the holding tank with the cooling device lowered into position in the tank.
Figure 7B:
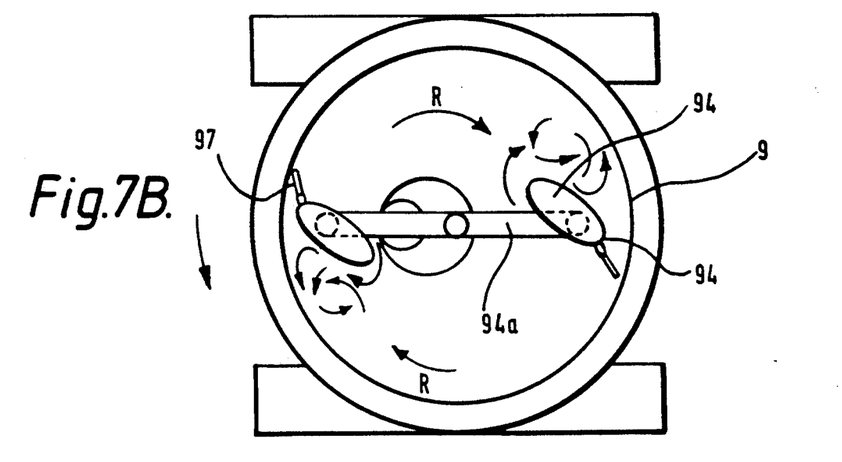
FIG. 7B is a cross-section on the line B—B in FIG. 7A.

Scrapers 97 on the vanes dislodge product from the inner wall of the tank and force it into circulation within the tank so as to promote cooling of the tank contents by contact with the tank wall. Referring to FIG. 7B, the vanes 94 are oval in cross-section and arranged at an angle to the radial supports 94a on which the vanes are mounted. A scraper projects from one narrow end of each vane so that during rotation of the vane in the direction R the product scraped from the wall of the tank is made to flow across the leading long side of the vane and around the other narrow end of the vane to form eddies in the space between the trailing long side of the vane, as indicated by the remaining arrows. This arrangement ensures that the food product scraped from the wall is held in contact with the vane for as long as possible and therefore cooled effectively. During rotation the flights 94b tend to displace the food product in a vertical direction to improve homogeneity and uniform cooling. The lid or cover 91 is carried by support members 87, carried by pneumatic cylinders 88 for vertical movement.

Figures 8, 8A:
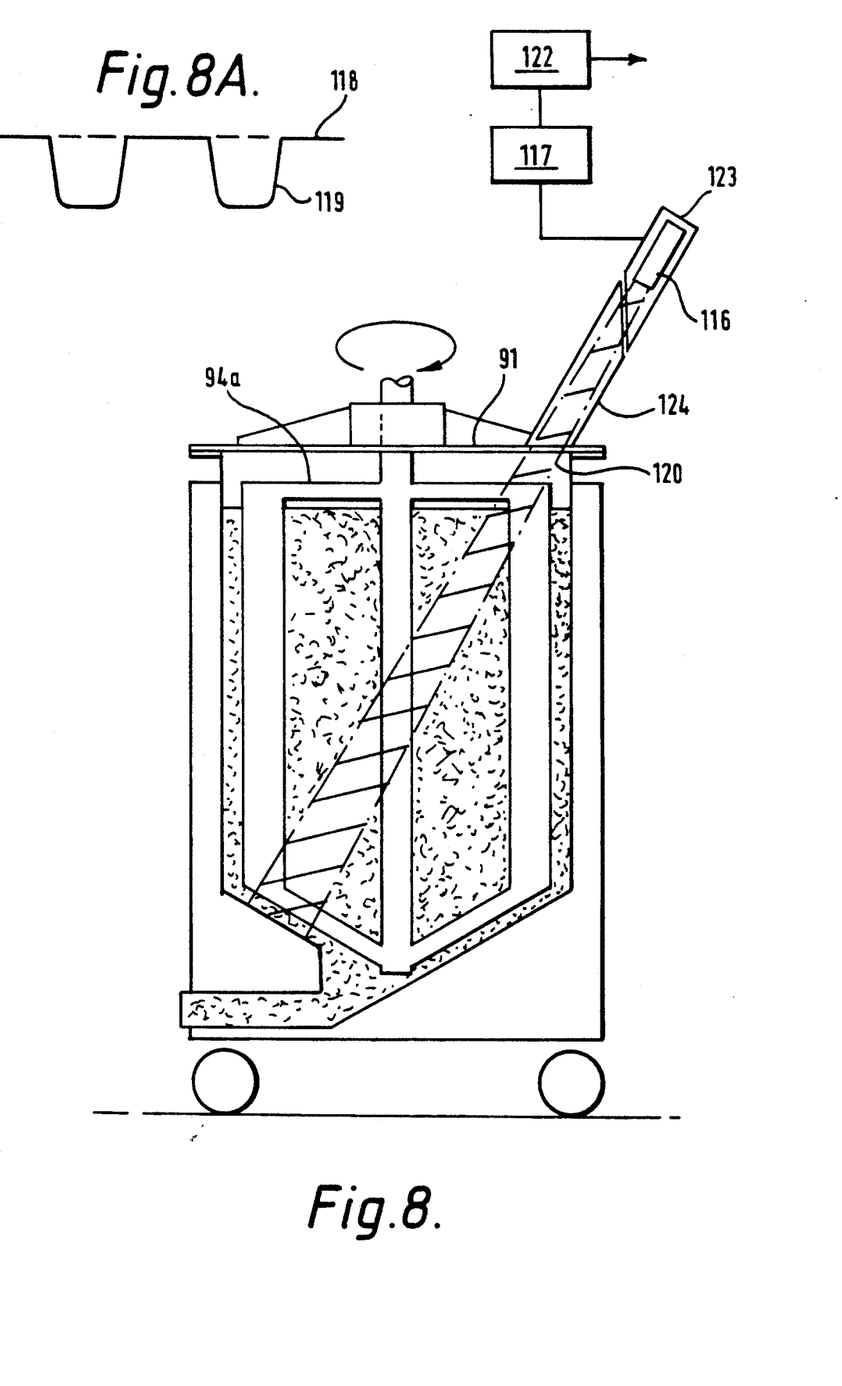
FIG. 8 is a view similar to FIG. 7A to show the sensing system.
FIG. 8A is a curve showing the signal output by the temperature sensor, FIG. 9 schematically illustrates a cooling station including at least three cooling booths.
Figure 9:
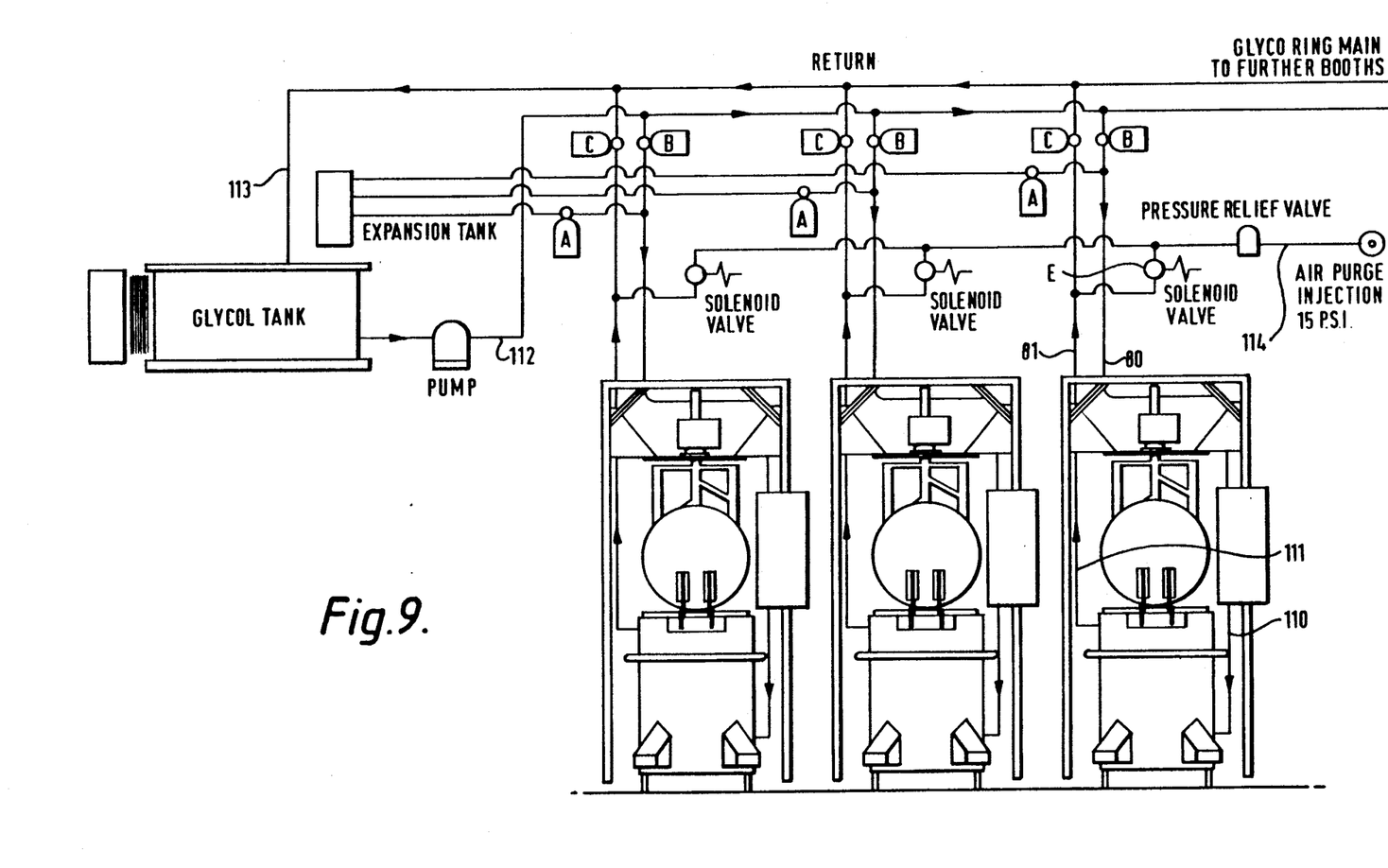

Referring also to FIG. 9, the cooling station preferably takes the form of a group of three or more booths into any of which the tanks may be wheeled. When a tank is in position, coolant supply and outlet hoses 110 are connected to the lower and upper ports respectively in the jacket of the tank, the cover 1a opened and the cooling unit lowered under the action of pneumatic cylinders 88. The various functions are performed through the agency of programmed control circuitry 122 which is brought into operation by the operator using a switch panel 62. When the cover is seated on the rim of the tank, a motor 89 driving the agitator through gearing 98 (FIG. 7A) is set in rotation, and valves B and C are opened and ethylene glycol circulated through the cooling unit and jacket (which has helical vanes to guide the coolant — see FIG. 7A) from the storage tank through lines 112, 113 until the temperature of the food product has fallen to the desired level. The temperature of the surface of the food product is monitored by an infrared sensor 116 including a thermocouple means directed at the surface of the food product, see FIG. 8. The sensor is housed within a tube 123 mounted on the frame of the booth at an angle to the horizontal. A tube 124 mounted on the lid 91 and opening therethrough aligns with the tube 123 when the cover 91 is positioned on the tank. A further tube 70 opening through the cover 91 aligns with a tube 71 on the frame which is connected to an air mover 72 which extracts air from the tank. Sterile air surrounding the tank enters the same through a narrow gap between the tubes 123, 124. This action serves to vent the head of steam which forms above the food product and promotes its cooling.

Because the vanes 94 and radial support 94a pass through the beam 120 received by sensor 116 twice during each revolution of the cooling unit, the signal 118 generated by the sensor includes repeated dips 119, as illustrated in FIG. 8A. The signal from sensor 116 is therefore output to electronic circuitry 117 which is programmed to eliminate the dips 119 and pass a signal at a constant level to control circuitry 122. Means responsive to the sensor serve to close the valves B and C when the temperature of the food product has fallen to 4° C. or less in order to terminate the cooling operation and open solenoid valve E and valve A to admit scavenging air to the circuit in the reverse flow direction from line 114 to drive the coolant into the expansion tank through line 115. A non-return valve may be provided prevents the scavenging air entering the circuit through the cooling unit. Following extraction of the cooling unit, the cover is replaced, the hoses disconnected and the tank wheeled to the filling line for insertion of tube 1b and discharge as shown in FIG. 1.

The booth frame is provided with a locking arrangement 120 operated by a pneumatic cylinder and which cooperates with the handling ring 121. The locking arrangement 120 and the system for raising the cooling unit is controlled from the control circuitry 122 in such a way that the tank cannot be released nor the cooling unit be raised by the operator until the sensor 116 detects a level temperature of −4° C. or lower. If it were not for the circuitry 117 the sensor would indicate the desired temperature before the surface of the food product has reached that temperature.

What is claimed is:

1. A food processing plant comprising a cooking kettle, a holding tank and a depositor; the holding tank being provided with wheels to permit the tank to be moved from a first position in the proximity of the cooking kettle to a second position in the proximity of the depositor, a first pipeline for coupling the holding tank to the kettle, a second pipeline for coupling the holding tank to the depositor, means for applying a vacuum to the tank in the first position to draw food product from the kettle through the first pipeline, means for applying pressurised air to the holding tank in the second position to expel the food product from the tank to the depositor; and a cooling station in the form of a booth into which the tank is movable after leaving the first position and before entering the second position, said booth including frame means supporting a cooling unit movable from a raised position into a lowered position within the tank, said cooling unit including rotary vanes with scrapers for contact with the wall of the tank mounted on a cover adapted to rest on the rim of the tank.

2. A food processing plant as claimed in claim 1, including temperature sensing means mounted in a tubular support communicating with the interior of the tank so as to receive infra-red energy emitted by the surface of the food product and generate a signal indicative of the temperature of the surface of the food product, and control means for the cooling operation responsive to the sensing means.

3. A food processing plant as claimed in claim 2, including means for retaining the tank within the booth and holding the cover of the cooling unit on the tank, and means responsive to the sensing means to prevent release of said retaining means.

4. A food processing plant as claimed in claim 1, wherein the holding tank has a hinged lid and hollow wall, and the cooling station comprises at least one other said cooling booth, each booth having a said frame means on which a said cooling unit is supported for movement in the vertical direction from a raised position into a lowered position within a tank positioned in the booth, each cooling unit having means for driving the unit in rotation; the cooling station further including a circuit for passing coolant through the vanes, a circuit connectable with the tank for passing coolant through the hollow wall, and means for passing scavenging air through at least the latter circuit to remove coolant prior to disconnecting the tank from the latter circuit.

5. A plant as claimed in claim 4, including a first tube extending obliquely from said cover and opening therethrough, a second tube mounted on the frame for alignment with said first tube, an infra-red sensor mounted within said second tube to view the surface of food product within the tank, and control means for the cooling operation responsive to said sensor.

6. A plant as claimed in claim 5, wherein said control means includes means for preventing opening of the cover or removal of the tank from the cooling booth until the temperature of the product falls below a predetermined level.

7. A plant as claimed in claim 6 including a further tube opening through the lid and connected to air moving means to remove steam from the above level of the food product.

8. A plant as claimed in claim 6, including means for correcting an output signal from the sensor to eliminate the effect of the vanes on the output therefrom.

9. A plant as claimed in claim 1, wherein the vanes are oval in cross-section and angled to the wall of the tank so that product removed from the wall by the scrapers passes over a longer edge of the associated vane and forms eddies adjacent the other longer wall.

* * * * *